US012362836B2

(12) United States Patent
Moeneclaey et al.

(10) Patent No.: US 12,362,836 B2
(45) Date of Patent: Jul. 15, 2025

(54) RECEIVER DEVICE, RECEPTION SYSTEM, PROCESS AND LIGHT-SIGNAL COMMUNICATION METHOD (71) Applicants: STMICROELECTRONICS (GRENOBLE 2) SAS, Grenoble (FR); STMICROELECTRONICS (ALPS) SAS, Grenoble (FR)

(72) Inventors: Nicolas Moeneclaey, Vourey (FR); Vratislav Michal, Fontanil-Cornillon (FR); Jean-Luc Patry, Crolles (FR)

(73) Assignees: STMICROELECTRONICS (GRENOBLE 2) SAS, Grenoble (FR); STMICROELECTRONICS (ALPS) SAS, Grenoble (FR)

( * ) Notice: Subject to any disclaimer, the term of this patent is extended or adjusted under 35 U.S.C. 154(b) by 235 days.

(21) Appl. No.: 18/150,115

(22) Filed: Jan. 4, 2023

(65) Prior Publication Data
US 2023/0239057 A1 Jul. 27, 2023

(30) Foreign Application Priority Data

Jan. 13, 2022 (FR) .................................. 2200265

(51) Int. Cl.
H04B 10/06 (2006.01)
H04B 10/61 (2013.01)

(52) U.S. Cl.
CPC .................. H04B 10/616 (2013.01)

(58) Field of Classification Search
CPC ................ H04B 10/616; H04B 10/691; H04B 10/6931; H04B 10/6932; H04B 10/6933; H04B 10/6971; H04B 10/6972; H04B 10/6973; H04B 10/695; H04B 10/40; H04B 10/0795; H04B 10/0779; H04B 10/693

(Continued)

(56) References Cited

U.S. PATENT DOCUMENTS

| 6,304,357 B1 * | 10/2001 | Ohhata | H04B 10/695 398/209 |
| 2005/0078966 A1 * | 4/2005 | Misaizu | H04B 10/695 398/214 |
| 2007/0212081 A1 * | 9/2007 | Takahashi | H04B 10/66 398/202 |

FOREIGN PATENT DOCUMENTS

| EP | 3350945 B1 | 11/2019 |
| WO | WO 2017046068 A1 | 3/2017 |

OTHER PUBLICATIONS

Adiono et al., "A Circuit for Robust Visible Light Communication Systems in Indoor Environment," *2018 10th International Conference on Information Technology and Electrical Engineering (ICITEE)*, IEEE, Bali, Indonesia, Jul. 24-26, 2018, pp. 68-72.

(Continued)

Primary Examiner — Hanh Phan
(74) Attorney, Agent, or Firm — Seed IP Law Group LLP (57) ABSTRACT The present disclosure is directed to a light-signal communication receiver device including a photo-receiving diode configured to generate a current signal on a first node from a received light signal, a preamplifier configured to convert the current signal on the first node into a voltage signal on a second node, and a differential amplifier including a first input connected to the first node and a second input connected to a third node coupled to the second node via an adjustment circuit. The adjustment circuit is configured to offset the level of the voltage signal of the second node, on the third node, in a controlled manner by a control signal.

20 Claims, 6 Drawing Sheets (58) Field of Classification Search
USPC ....... 398/202, 208, 209, 210, 212, 213, 214,
398/135, 136, 137, 138, 139, 158, 159,
398/33, 38, 25, 26, 27, 22, 23;
250/214 A, 214 AG; 330/59, 308
See application file for complete search history.

(56) References Cited

OTHER PUBLICATIONS

Ahmed et al., "A CMOS Transimpedence Amplifier With Ambient Light Rejection for Visible Light Communication in Intelligent Transport Systems," *2019 15th International Wireless Communications & Mobile Computing Conference (IWCMC)*, IEEE, Tangier, Morocco, Jun. 24-28, 2019, pp. 7-13.

Quadir et al., "An Active Inductor Based TIA with Ambient Light Rejection for VLC Applications," *2021 IEEE International Midwest Symposium on Circuits and Systems (MWSCAS)*, Lansing, MI, USA, Aug. 9-11, 2021, pp. 882-885.

\* cited by examiner

RECEIVER DEVICE, RECEPTION SYSTEM, PROCESS AND LIGHT-SIGNAL COMMUNICATION METHOD

BACKGROUND

Technical Field

The embodiments and implementations relate to light-signal communication.

Description of the Related Art

Light-signal communication is a technique for data communication, using a modulation of a light signal, for example a visible or infrared light signal, generated by an emitter and received by a receiver.

During a light-signal communication, the distance between the emitter and the receiver could change, and the ambient luminosity of the medium in which the communication is done could also change. Typically, the receiver should be capable to adapt to these changes.

That being so, it is recognized that these possible changes of the light signal received by the receiver a negligible variation rate in comparison with the frequency of the signal. Consequently, the conventional light-signal communication receivers typically use a filtering technique adapted to stabilize on the average level of the received signal, usually referred to as "AC coupling." Thus, this technique allows to position a threshold for the detection of the information received between a received light constant level and a high level of the signal, in order to adapt to both the intensity of the ambient luminosity and the amplitude of the signal of the light-signal communication (related to the emitter-receiver distance).

The "AC coupling" filtering technique functions properly for a communication of a continuous data stream with alternately high and low levels, and established from a non-negligible duration longer than the response time of the filter to stabilize.

Yet, some communication techniques utilize a capability to detect the first bit received after a silence of the communication.

Moreover, since there is no clock signal shared between the emitter and the receiver, an encoding is typically used for the communication, for example a Manchester-type encoding.

This type of data encoding, conventional and well known to a person skilled in the art, allows to distinguish the data successively communicated between two non-synchronized elements, but has the drawback of using several bits to encode a data (in Manchester code, two successive levels in the signal are used to encode one single binary data), which reduces the rate of the communication in data amount.

Thus, there is a desire for overcoming the above-mentioned drawbacks, i.e., providing a light-signal communication technique capable of adapting to the changes in the medium of the communication (ambient luminosity, emitter-receiver distance), capable of detecting a first bit received after a silence of the communication, and effective for data rate.

BRIEF SUMMARY

According to one aspect, a light-signal communication receiver device is provided including a photo-receiving diode configured to generate a current signal on a first node from a received light signal, a preamplifier configured to convert the current signal on the first node into a voltage signal on a second node, and a differential amplifier including a first input connected to the first node and a second input connected to a third node coupled to the second node via an adjustment circuit configured to offset the level of the voltage signal of the second node, on the third node, in a controlled manner by a control signal.

Thus, in contrast with the conventional techniques using a filtering of the continuous component of the received signal such as a reference voltage on a first input of a differential stage, the device according to one aspect uses the voltage of the photo-receiving diode, typically very stable at the threshold voltage of the diode, and has on the first node, as a reference on the first input of the differential amplifier.

Consequently, the differential amplifier is immediately responsive in case of reception of a light signal, retransmitted on the third node by the preamplifier and the adjustment circuit, and in particular does not need a stabilization period for the response time of the conventional filters.

According to one embodiment, the preamplifier includes a transistor having a control terminal coupled to the first node and a conduction terminal coupled to the second node, a resistive element coupled between the first node and the second node, and a current generator circuit configured to generate a polarization current on the second node.

In other words, the preamplifier may be made according to a simplified mounting of the resistive transimpedance amplifier type.

According to one embodiment, the adjustment circuit includes a resistive element coupled between the second node and the third node and a current generator circuit configured to generate an adjustment current on the third node, at an intensity controlled by the control signal.

For example, the current generator circuit may be of the digital-to-analog converter with a current output, allowing in particular for a greater accuracy on the intensity of the generated current from a command having a binary-encoded numerical value.

According to one embodiment, the device further includes a control circuit configured to generate the control signal according to an output signal of the differential amplifier so as to offset the level of the voltage signal of the second node on the third node to a level centered on the voltage level of the photo-receiving diode on the first node.

By level "centered" on the voltage level of the diode, it should be understood that the average between a high level of the voltage signal and a low level of the voltage signal is substantially equal to the voltage level of the diode. In this respect, it is possible to reset to zero the difference between the two inputs of the differential amplifier and offset by a value corresponding to half the amplitude of the voltage signal, and preferably and advantageously, with the calibration according to the embodiment defined hereinbelow.

According to one embodiment, in order to offset the level of the signal on the third node to a level centered on the voltage level of the photo-receiving diode, the control signal is configured to perform a calibration comprising a first step, intended for first ambient light conditions, comprising an identification of a first value of the control signal allowing to offset the level of the voltage signal on the third node to the same level as the voltage on the first node of the photo-receiving diode, and a second step, intended for second ambient light conditions, comprising an identification of a second value of the control signal allowing to offset the level of the voltage signal on the third node to the same level as the voltage on the first node of the photo-receiving diode.

This allows to obtain the low level of the voltage signal of the light-signal communication (first step) and the high level of the voltage signal of the light-signal communication (second step), for example by means of auto-zeroing techniques accessing sequentially and more and more finely to a zero difference between the inputs of the differential amplifier.

According to one embodiment, the calibration comprises the establishment of a calibrated value of the control signal equal to the first value added with half the difference between the first value and the second value.

According to one embodiment, the receiver device further includes an output stage configured to output a square output signal from outputs of the differential amplifier, an oscillator circuit configured to generate a plurality of phases of a clock signal having clock cycles, and a signal recovery stage configured to detect in the output signal a bit packet start indicator, identify one of said phases whose clock cycle starts the closest to the bit packet start indicator, and delimit, in the output signal, bits of a bit packet on the clock cycles of the clock signal at the identified phase.

Advantageously, this allows to obtain an inner time reference, on the identified phase, to delimit the width of each bit transmitted per packet during the light-signal communication. Even though the inner clock signal of the receiver is slightly different in frequency from the clock signal having cadenced the generation of the light signal, the bits could be delimited faithfully to their original cadence thanks to the identification of the phase aligned on the bit packet start indicator.

Consequently, this embodiment allows to get rid of a Manchester-type encoding, intended for the identification of the data, advantageous for the data rate.

According to another aspect, a light-signal communication system is provided including a receiver device as defined hereinbefore, and an emitter deice comprising a photo-emitting diode configured to generate the light signal conveying bit packets, the successive bit packets being separated over time by a duration at least equal to the duration of a bit packet.

Indeed, the receiver device as defined hereinbefore advantageously enables a communication type wherein successive bit packets are communicated with a considerable time shift, and without sharing a common clock signal between the emitter and the receiver device.

According to one embodiment, the receiver device and the emitter device collaborate in the calibration so that the emitter device does not generate the light signal in the first step, the first ambient light conditions comprising an ambient luminosity, and so that the emitter device generates the light signal continuously in the second step, the second ambient light conditions comprising the ambient luminosity and the luminosity of the emitted signal.

According to one embodiment, each of the receiver device and the emitter device includes an independent oscillator circuit, configured to generate respective clock signals having clock cycles and set at the same frequency, the emitter device being configured to delimit, over the clock cycles of the clock signal, the generation of the bits of the emitted bit packets, the receiver device being configured to delimit, over the clock cycles of the clock signal, the detection of the bits of the received bit packets.

According to another aspect, a process for receiving a light-signal communication is provided comprising:

a generation of a current signal on a first node from a light signal received by a photo-receiving diode,
a pre-amplification converting the current signal on the first node into a voltage signal on a second node,
an offset, on a third node of the level of the voltage signal of the second node in a controlled manner by a control signal,
a differential amplification between the voltage present on the first node and the voltage present on the third node.

According to one implementation, the pre-amplification comprises a flow of the current signal in a resistive element coupled between a control terminal of a transistor coupled to the first node and a conduction terminal of the transistor coupled to the second node, and a generation of a polarization current on the second node.

According to one implementation, the offset on the third node of the level of the voltage signal of the second node comprises a generation of an adjustment current, with an intensity controlled by the control signal, in a resistive element coupled between the second node and the third node.

According to one implementation, the process comprises the generation of the control signal according to an output signal of the differential amplifier so as to offset the level of the voltage signal of the second node on the third node to a level centered on the voltage level of the photo-receiving diode on the first node.

According to one implementation, in order to offset the level of the signal on the third node to a level centered on the voltage level of the photo-receiving diode, a calibration comprises a first step, intended for first ambient light conditions, comprising an identification of a first value of the control signal allowing to offset the level of the voltage signal on the third node to the same level as the voltage on the first node of the photo-receiving diode, and a second step, intended for second ambient light conditions, comprising an identification of a second value of the control signal allowing to offset the level of the voltage signal on the third node to the same level as the voltage on the first node of the photo-receiving diode.

According to one implementation, the calibration comprises the establishment of a calibrated value of the control signal equal to the first value added with half the difference between the first value and the second value.

According to one implementation, the process further comprises a processing of the signal derived from the differential amplification so as to output a square output signal, a generation of a plurality of phases of a clock signal having clock cycles, and a detection in the output signal of a bit packet start indicator, an identification of one of said phases whose clock cycles starts the closest to the bit packet start indicator, and a delimitation, in the output signal, of the bits of a bit packet over the clock cycles of the clock signal at the identified phase.

According to another aspect, a method for communication by light signal is provided including a reception process as defined hereinbefore, and an emission comprising a generation, by a photo-emitting diode, of the light signal conveying bit packets, the successive bit packets being separated over time by a duration at least equal to the duration of a bit packet.

According to one implementation, the reception process and the emission collaborate in the calibration so that the emission comprises a generation of the light signal in the first step, the first ambient light conditions comprising an ambient luminosity, and so that the emission comprises a continuous generation of the light signal, the second ambient light conditions comprising the ambient luminosity and the luminosity of the emitted signal.

According to one implementation, each of the reception process and the emission comprises a generation of clock signals having respective clock cycles set at the same frequency, the emission comprising a delimitation, over the clock cycles of the clock signal, of the generation of the bits of the emitted bit packets, the reception process comprising a delimitation, over the clock cycles of the clock signal, of the detection of the bits of the received bit packets.

BRIEF DESCRIPTION OF THE SEVERAL VIEWS OF THE DRAWINGS

Other advantages and features of the various embodiments of the present disclosure will appear upon examining the detailed description of non-limiting embodiments and implementations, and from the appended drawings, wherein.

DETAILED DESCRIPTION

Figure 1:
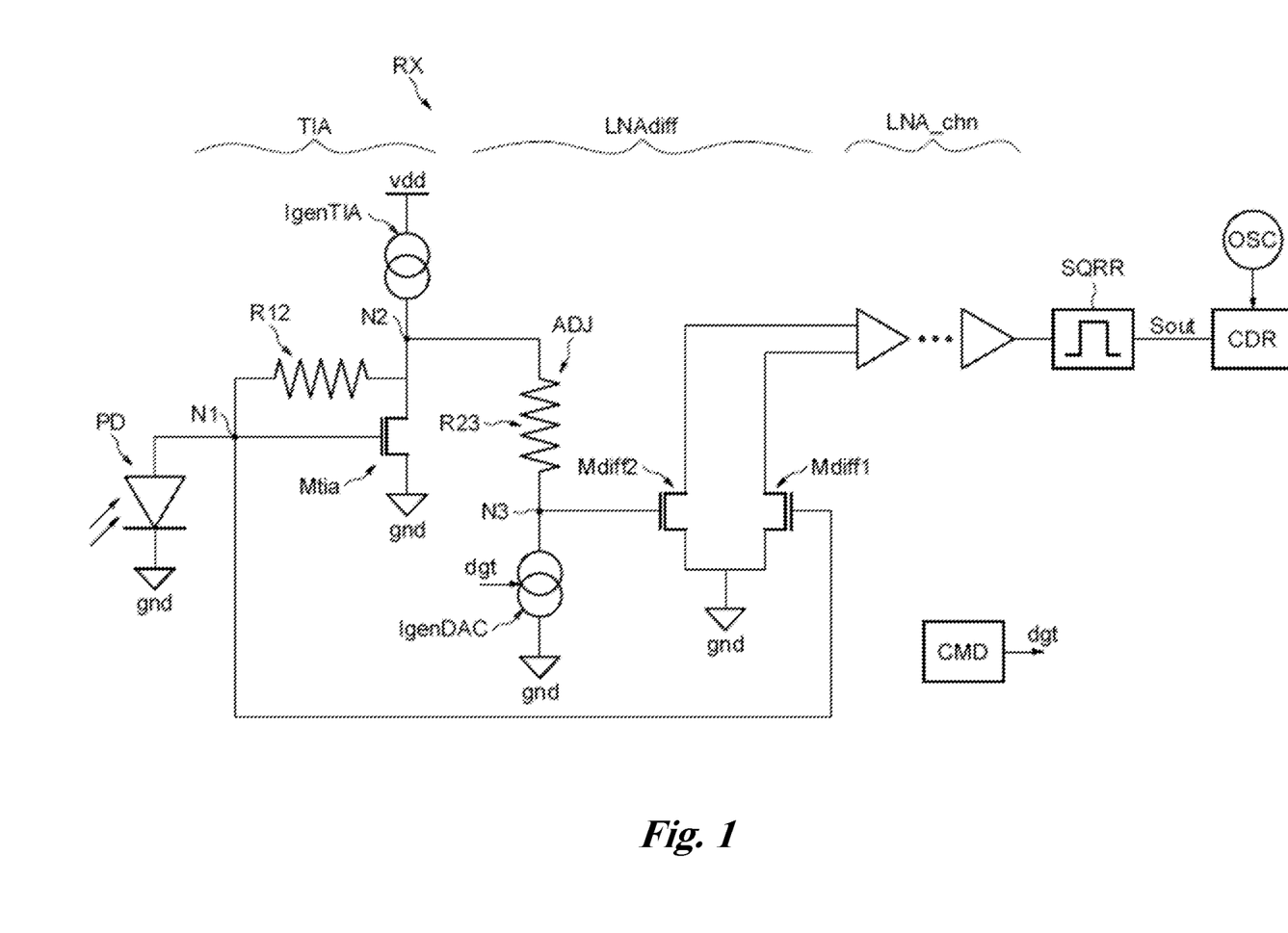
FIG. 1 illustrates an example of a light-signal communication receiver device, according to an embodiment of the present disclosure.

FIG. 1 illustrates an example of a light-signal communication receiver device RX. The receiver device RX includes a photo-receiving diode PD configured to generate a current signal on a first node N1 from a received light signal, and originating from an external environment.

A preamplifier TIA is configured to convert the current signal on the first node N1 into a voltage signal on a second node N2.

For example, the preamplifier TIA may be of the resistive transimpedance amplifier type, and include a transistor Mtia whose control terminal, i.e., the gate, is coupled to the first node N1 and a conduction terminal of which, i.e., the drain, is coupled to the second node N2. The other conduction terminal of the transistor Mtia, i.e., the source, is coupled to a ground reference voltage terminal gnd. A resistive element R12 is coupled between the first node N1 and the second node N2 of the circuit, i.e., between the gate and the drain of the transistor Mtia. Finally, a current generator circuit IgenTIA is configured to generate a so-called polarization current on the second node N2.

In the presence of light, for example any amount of ambient light, the photo-receiving diode is in an electric charge photogeneration operating mode, imposes its constant threshold voltage at its terminals and generates a photogenerated current on the first node N1 and therefore through the resistive element R12.

Thus, in this elementary example of a resistive transimpedance amplifier TIA, the voltage signal on the second node N2 corresponds to the threshold voltage of the diode present on the first node N1 added with the product of the resistance of the resistive element R12 by the intensity of the photogenerated current crossing the resistive element R12.

A differential amplifier LNAdiff includes a first input connected to the first node N1 and a second input connected to a third node N3 coupled to the second node N2 via an adjustment circuit ADJ. The adjustment circuit ADJ is configured to offset the level of the voltage signal of the second node N2, on the third node N3, in a controlled manner by a control signal dgt.

The adjustment circuit ADJ may include a resistive element R23 coupled between the second node N2 and the third node N3 and a current generator circuit IgenDAC configured to generate an adjustment current on the third node N3, at an intensity controlled by the control signal dgt. Thus, the amplitude of the offset, on the third node N3, of the voltage level of the second node N2 is equal to the product of the intensity of the adjustment current by the resistance of the resistive element R23.

Advantageously, the current generator circuit IgenDAC may be digital-to-analog converter type circuit, configured to generate an adjustment current having an intensity accurately controlled by a digital control signal dgt. The digital control signal dgt is usually a binary word encoding a number or a value, the intensity of the adjustment current being accurately proportional to the encoded value dgt.

The receiver device RX may include a control circuit CMD configured to generate the control signal dgt according to an output signal of the differential amplifier LNAdiff, in particular so as to transmit on the second node N3 of the differential amplifier LNAdiff, the voltage level of the second node N2 offset to a level centered on the voltage level of the first input N1 of the differential amplifier LNAdiff, i.e., the first voltage level of the photo-receiving diode PD present on the first node N1.

The differential amplifier LNAdiff outputs on two differential output branches a measurement of the difference between the levels of the voltage signals present on its two inputs N1, N3.

In this example, an output stage includes a chain of amplifiers LNA_chn, for example amplifiers of the low-noise amplifier ("LNA") type, allows to amplify the signal representative of the measurement at the output of the differential amplifier LNAdiff.

The output stage includes a squarer circuit SQRR adapted to output a square output signal Sout, which could be used by digital circuits, corresponding to the variations of the amplified analog signal. Conventionally, a "square" signal is a signal having two voltage levels, a high level and a low level, and very quick transitions (rising edges, falling edges) between the two levels.

Figure 2:
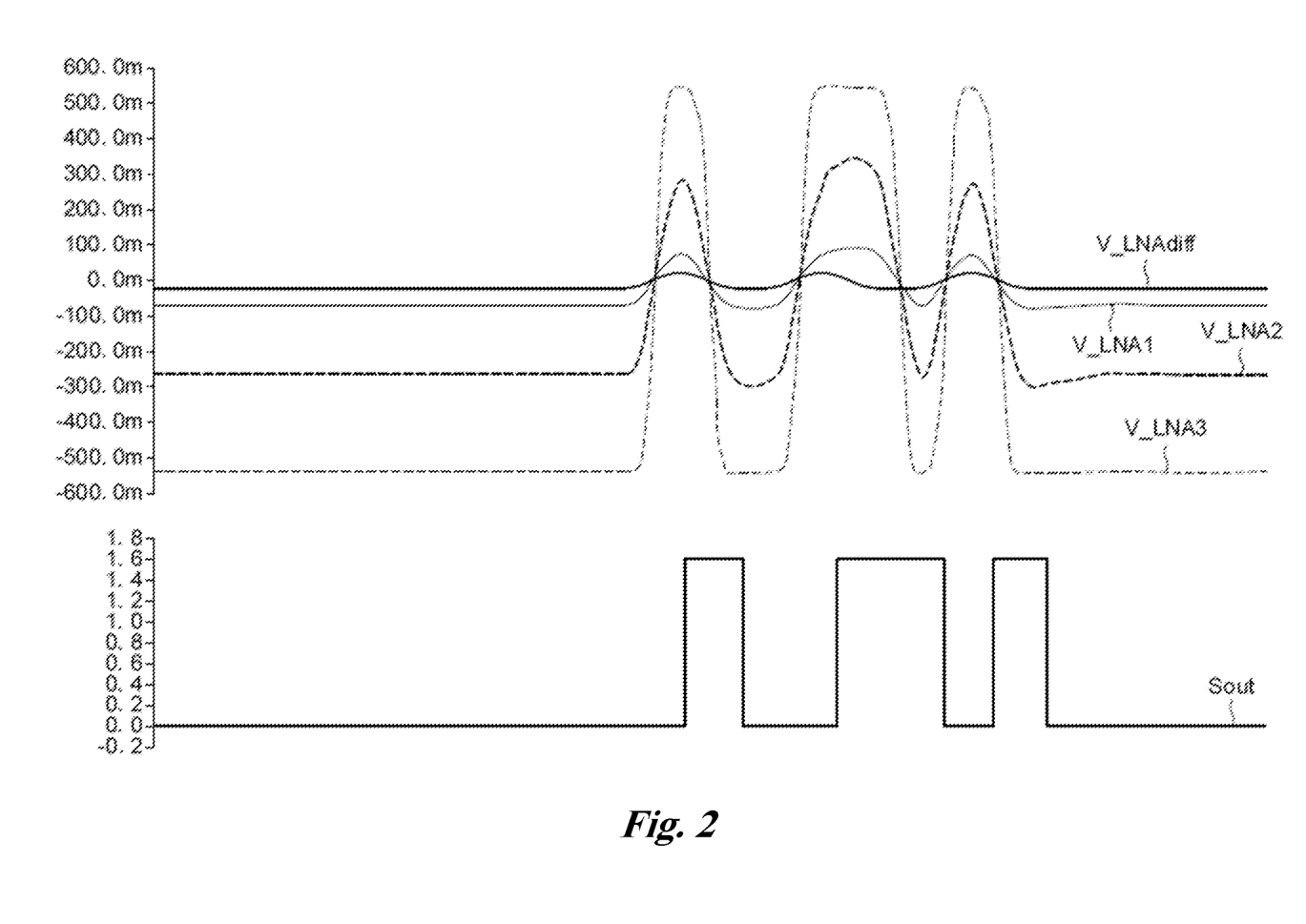
FIG. 2 illustrates time charts of a representative signal of a measurement at an output of a differential amplifier and of output signals of successive amplifiers of chain of low-noise amplifiers, of the light-signal communication receiver device of FIG. 1.

In this respect, reference is made to FIG. 2.

FIG. 2 illustrates the time charts of the representative signal of the measurement at the output of the differential amplifier V_LNAdiff, and of the output signals of the successive amplifiers V_LN1, V_LNA2, V_LN3 of the chain of low-noise amplifiers LNA_chn. The time chart of the square output signal Sout derived from the last amplified signal V_LN3 is also illustrated.

In order to selectively trigger the thresholds of the squarer circuit SQRR, all of the successive amplified signals should be centered on 0 V, and therefore the representative signal of the measurement at the output of the differential amplifier V_LNAdiff should be centered on 0 V.

In this respect, it should be recalled that the adjustment circuit ADJ allows to center the level of the second input N3 of the differential amplifier LNAdiff on the level of the first input N1 of the differential amplifier LNAdiff.

Figure 3:
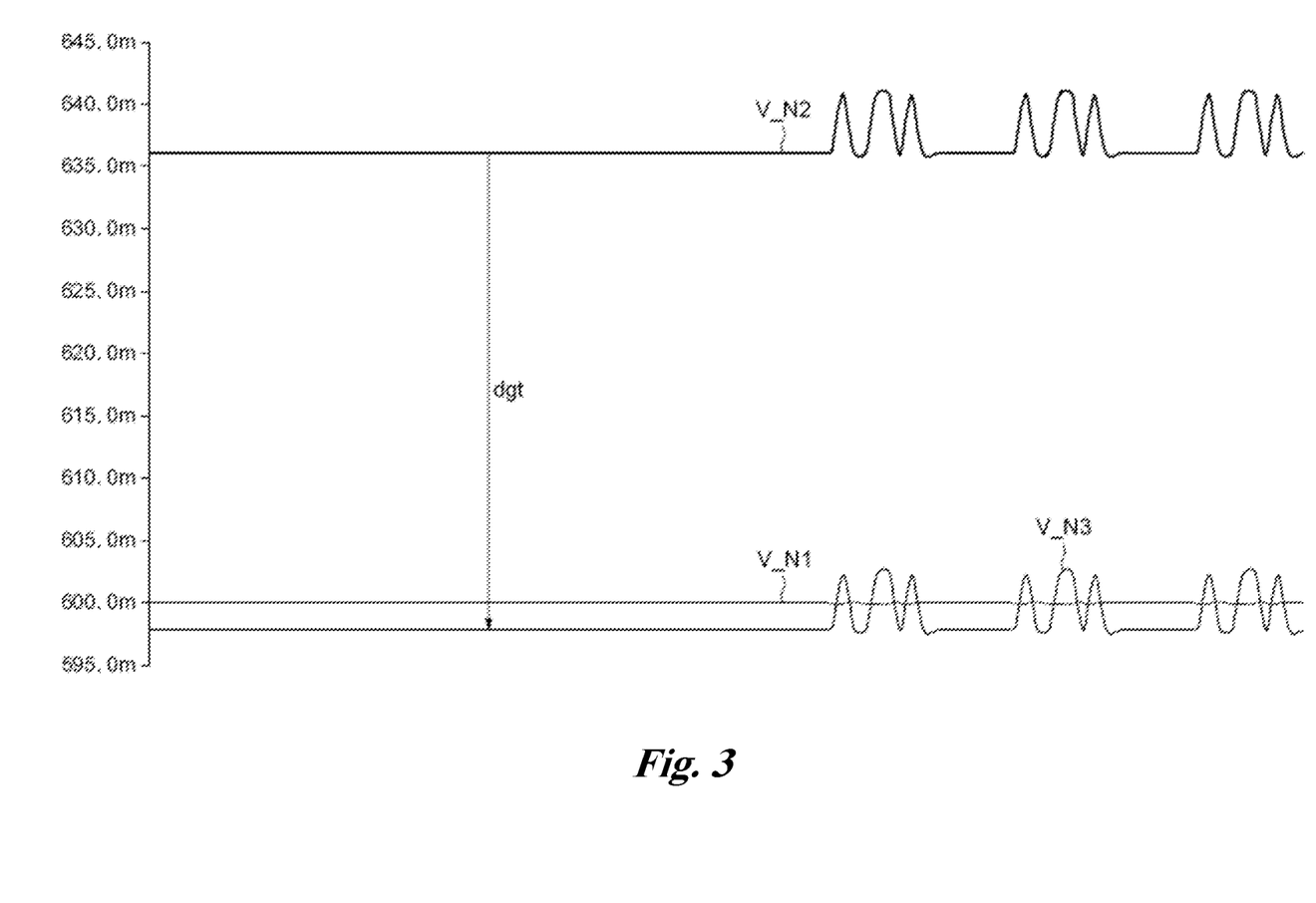
FIG. 3 illustrates time charts of voltage levels of a first node, of a voltage signal present on a second node, and of an offset voltage signal on a third node, of the light-signal communication receiver device of FIG. 1.
Figure 4:
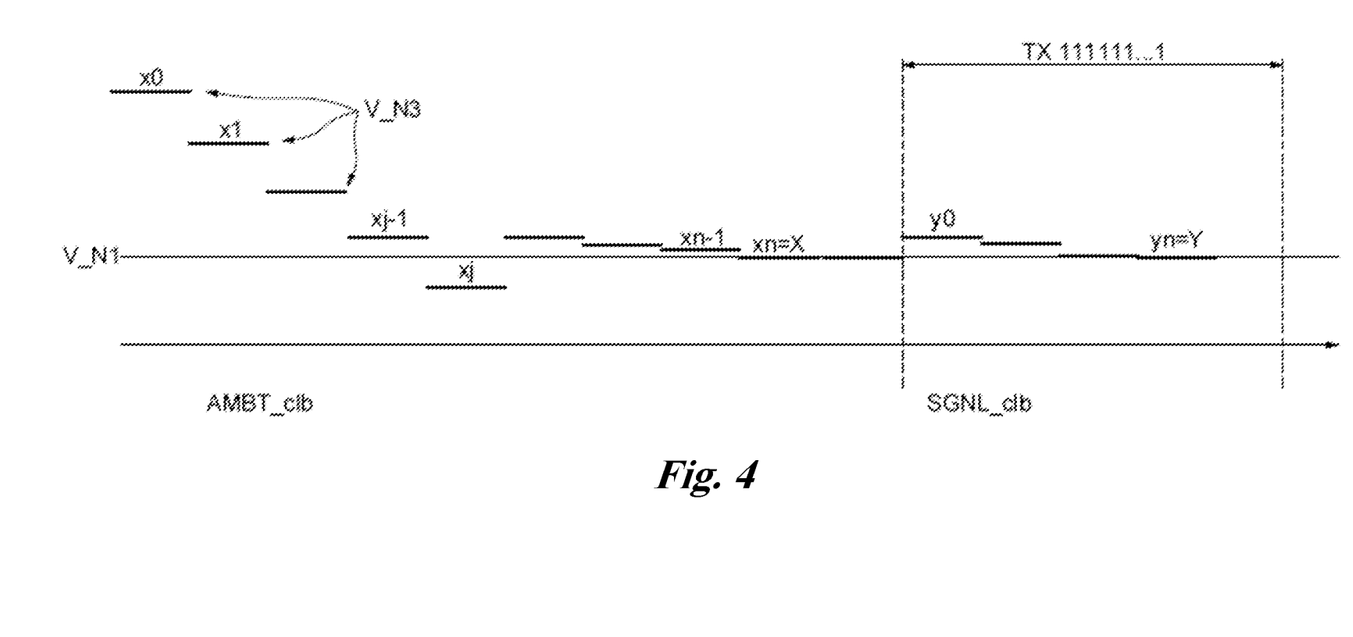
FIG. 4 illustrates a calibration process, implemented for example by a control circuit, of the light-signal communication receiver device of FIG. 1.

As of now, reference is made to FIGS. 3 and 4.

FIG. 3 illustrates the time charts of the voltage levels of the first node V_N1, of the voltage signal present on the second node V_N2 and of the offset voltage signal on the third node V_N3.

Advantageously, the value of the digital control signal dgt is selected so as to bring the level of the voltage signal V_N2 to an offset level V_N3 centered on the voltage level of the photo-receiving diode V_N1, by means of the adjustment circuit ADJ.

The offset voltage signal V_N3 is centered on the level of the threshold voltage V_N1 when the deviation between the level of the threshold voltage V_N1 and the low level of the offset voltage signal V_N3 is equal or substantially equal to the deviation between the level of the threshold voltage V_N1 and the high level of the offset voltage signal V_N3.

In this respect, the control circuit CMD may be configured to access the output branches of the differential amplifier LNAdiff, outputting information on the difference between the levels of the voltages present on the first input N1 and on the second input N3.

The control circuit CMD can generate control signals dgt with successive values aiming to bring the difference between the two inputs of the differential amplifier LNAdiff down to zero. Afterwards, an additional offset by a value corresponding to half the amplitude of the offset voltage signal V_N3, is preferably and advantageously applied with the calibration process described hereinafter with reference to FIG. 4.

FIG. 4 illustrates a calibration process, implemented for example by the control circuit CMD, allowing offsetting the level of the offset voltage signal V_N3 to a level centered on the voltage level of the photo-receiving diode V_N1.

The calibration comprises a first step AMBT_clb, intended for first ambient light conditions, for example conditions in which a given amount of ambient light is present and the signal of the light-signal communication is absent.

The calibration comprises a second step SGNL_clb, intended for second ambient light conditions, for example conditions in which the same amount of ambient light is present and the signal of the light-signal communication is continuously present. Advantageously, the receiver device RX is configured to cooperate with an emitter TX for this purpose, as described hereinafter with reference to FIG. 6.

It is considered that the amount of ambient light varies in a much slower manner than the time of implementation of the calibration and of a light-signal communication, thus the amount of ambient light is constant during the first step AMBT_clb and during the second step SGNL_clb.

The first step AMBT_clb comprises an identification of a first value X of the control signal dgt allowing to offset the level of the voltage signal on the third node V_N3 to the same level as the voltage on the first node V_N1 of the photo-receiving diode PD, in the first ambient light conditions.

In this respect, the first step AMBT_clb may comprise an auto-zeroing algorithm between the output branches of the differential amplifier LNAdiff by variation of the voltage levels on the input terminals N1, N3 of the differential amplifier LNAdiff. For example, the auto-zeroing algorithm comprises a sequence of iterations x0, x1, . . . , xn−1, xn, each comprising a reading of the output signal of the differential amplifier LNAdiff, representative of the difference between the level of the offset voltage signal V_N3 and the level of the threshold voltage of the diode V_N1. At each iteration, if the level of the offset voltage signal V_N3 is higher than the level of the threshold voltage of the diode V_N1, the value of the control signal dgt is increased by a given step. The sequence stops when it reaches a zero difference or a difference close enough to zero. Advantageously, when the difference becomes zero at a given iteration xj, the algorithm may provide for returning to the value of the previous iteration xj−1, and resuming the sequence with a smaller step until reaching or being close enough to a zero difference xn. The value of the last iteration xn gives a first value X related to the first am-bient light conditions.

The second step SNGL_clb comprises an identification of a second value Y of the control signal dgt allowing to offset the level of the voltage signal on the third node N3 to the same level as the voltage on the first node N1 of the photo-receiving diode PD, in the second ambient light conditions.

In this respect, the second step SNGL_clb may comprise the same auto-zeroing algorithm between the output branches of the differential amplifier LNAdiff by variation of the voltage levels on the input terminals N1, N3 of the differential amplifier LNAdiff, comprising a sequence of iterations y0, . . . , yn, increasing the value of the control signal dgt by a given step until reaching a zero difference or a difference close enough to zero. Advantageously, the value of the control signal dgt of the first iteration of this implementation is selected equal to the first value X (i.e., the value of the last iteration xn of the first step AMBT_cal). Advantageously, the sequence of the second step SNGL_cal could be performed with the smallest step. The value of the last iteration yn gives a second value Y related to the second ambient light conditions.

Of course, other auto-zeroing algorithms could be implemented in the first step AMBT_cal and in the second step SGNL_cal, for example to profit from a greater accuracy or from a quicker convergence time.

The first value X enables a calibration of the inputs of the differential amplifier LNAdiff for ambient light without any signal of the communication, i.e., for the low level of the communication signal in the environment in which the device RX is located. The second value Y enables a calibration of the inputs of the differential amplifier LNAdiff for ambient light in the presence of the signal of the communication, i.e., for the high level of the communication signal in the environment in which the device RX is located.

Starting from the first value X and from the second value Y, the calibration comprises the establishment of a calibrated value of the control signal dgt, equal to the first value X added with half the difference between the first value X and the second value Y, namely dgt=X+(Y−X)/2. Thus, the calibrated value dgt=X+(Y−X)/2 of the control signal allows to perfectly center the level of the offset voltage signal V_N3 on the level V_N1 of the threshold voltage of the diode PD, as illustrated in FIG. 3 irrespective of the environment.

Indeed, the calibration described hereinbefore allows to take into account the ambient luminosity (during the first step AMBT_clb) and to take into account the amplitude of the received signal (during the second step SGNL_clb), so that the inputs N1, N3 of the differential amplifier LNAdiff are perfectly balanced, in particular irrespective of the intensity of the ambient light and irrespective of the distance between the receiver device and an emitter outputting the signal of the light-signal communication.

Figure 5:
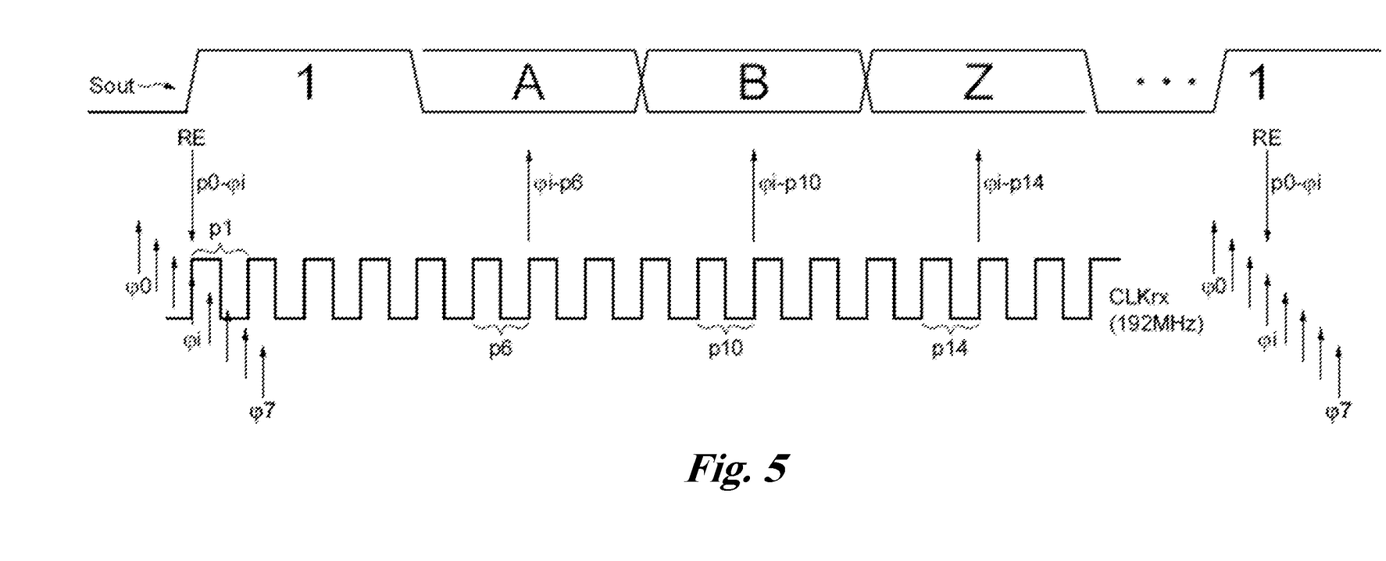
FIG. 5 illustrates a light-signal communication example for the light-signal communication receiver device of FIG. 1.

FIG. 5 illustrates a light-signal communication example, for which the receiver device RX described before with reference to FIGS. 1 to 4 is advantageously suited.

Referring to FIG. 1, it should be recalled that the receiver device RX includes an output stage LNA_chn, SQRR configured to output a square output signal Sout from the output branches of the differential amplifier LNAdiff.

Furthermore, the receiver device RX includes a signal recovery stage CDR and an oscillator circuit OSC configured to generate a plurality of phases φ0, φi, φ7 of a clock signal having clock cycles.

For example, the oscillator OSC is configured to generate a clock signal CLKrx, typically a square periodic signal, having clock cycles, a clock cycle being typically a period p6, p10, p14 of the periodic signal and being typically identified by a rising edge of the periodic signal. For example, the clock signal CLKrx may have a frequency of substantially 200 MHz (megahertz), for example 192 MHz, and be generated over eight phases φ0, φi, φ7 spaced apart in a homogeneous manner, i.e., having a shift of substantially 0.625 ns (nanoseconds) between two phases.

In this light-signal communication example, a bit packet 1ABZ has been received by the receiver device RX and retranscribed in the output signal Sout.

The signal recovery stage CDR is configured to detect in the output signal Sout a bit packet start indicator RE, for example a rising edge RE of a bit equal to 1, and to identify amongst the different phases φ0-φ7, the phase φi a clock cycle p1 of which starts the closest to the bit packet start indicator RE.

Thus, the identified phase φi of the clock signal CLKrx is selected so as to cadence the recovery of the received signal, and the first period p1 of the identified phase φi, aligned with the packet start indicator RE, will serve as a reference (or, in other words, "starting point") in the clock signal CLKrx for the recovery of the signal.

Indeed, starting from the reference period p1 in the identified phase φi, the recovery stage CDR is configured to delimit the different bits ABZ of the bit packet, according to the expected communication convention. In this example, each bit 1, A, B, Z of the packet is sent over four periods of the clock signal CLKrx, thus it is possible to detect the center of the bit A after the four periods of the packet start bit "1" and after two bits (middle of A), i.e., after the sixth period p6. Likewise, the bit B of the packet is detected on the rising edge after the tenth period p10 and the bot Z of the packet is detected on the rising edge after the fourteenth period p14 of the identified phase φi of the clock signal CLKrx.

Consequently, even in the absence of a clock signal shared between the emitter and the receiver of the light-signal communication, the different bits of a bit packet 1ABZ could be accurately delimited with respect to the packet start indicator RE, over the periods of the identified phase φi of the inner clock signal of the receiver RX.

This allows to resist to a difference of substantially 3% between the frequencies that respectively cadence the emission and the reception of the signal of the light-signal communication.

Figure 6:
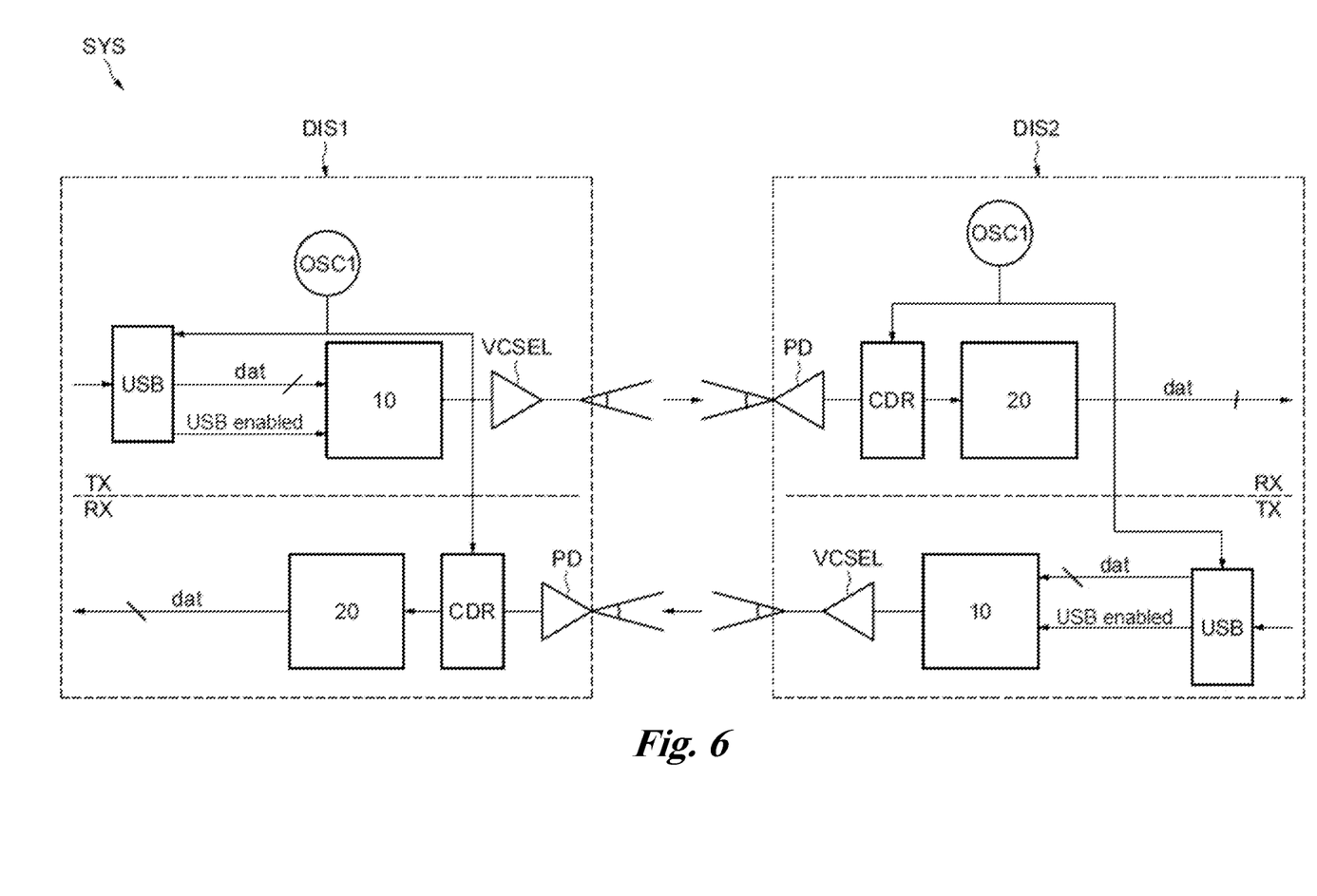
FIG. 6 illustrates an example of a light-signal communication system including the light-signal communication receiver device of FIG. 1 and an emitter, according to an embodiment of the present disclosure.

FIG. 6 illustrates an example of a light-signal communication system SYS including a receiver device RX as described before with reference to FIGS. 1 to 5, and an emitter TX as mentioned before.

In practice, the communication could be done between two light-signal communication devices DIS1, DIS2, each including a receiver RX, i.e., for example the receiver device RX described before with reference to FIGS. 1 to 5, and an emitter. The receiver RX of each device DIS1/DIS2 is intended to communicate with the emitter TX of the other device DIS2/DIS1.

The emitter of each device DIS1/DIS2 includes a photo-emitting diode VCSEL configured to generate the modulated light signal to convey bit packets. The bit packets could be separated over time by a duration at least equal to the duration of a bit packet (for example as illustrated in FIG. 5 or in FIG. 3, after reception by the receiver RX of the other device DIS2/DIS1).

In particular, each device DIS1, DIS2 includes a respective inner oscillator circuit OSC1, OSC2 independent of the other, configured to generate inner clock signals set at the same frequency, for example 192 MHz.

The emitter TX of one of the devices DIS1/DIS2 is configured to delimit, over the clock cycles of its inner clock signal OSC1/OSC2, the generation of the bits of the emitted bit packets 1ABZ, whereas the receiver RX of the other device DIS2/DIS1 is configured to delimit, over the clock cycles of its inner clock signal OSC2/OSC1, the detection of the bits of a received bit packet 1ABZ.

Moreover, conventionally, the emitter TX includes scheduling and encoding means 10 adapted to drive the photo-emitting diode VCSEL, as well as a data stage, for example a USB interface, adapted to supply the data dat to the scheduling and encoding means 10, as well as a USB enabled signal.

In turn, the receiver RX includes, at the output of the signal recovery stage CDR, conventional demultiplexing and decoding means 20 adapted to output a data signal dat.

In particular, the receiver RX of one of the devices DIS1/DIS2 and the emitter TX of the other device DIS2/DIS1, can collaborate in the calibration of the receiver RX described before with reference to FIG. 4. Advantageously, the collaboration is done so that the emitter TX does not generate the light signal in the first step AMBT_clb of the calibration, so that the first ambient light conditions actually comprise the ambient light; and so that the emitter TX continuously generates the light signal in the second step SGNL_clb of the calibration, so that the second ambient light conditions actually comprise the ambient luminosity and the luminosity of the emitted signal.

A light-signal communication receiver device may be summarized as including a photo-receiving diode (PD) configured to generate a current signal on a first node (N1) from a received light signal, a preamplifier (TIA) configured to convert the current signal on the first node (N1) into a voltage signal on a second node (N2), and a differential amplifier (LNAdiff) including a first input connected to the first node (N1) and a second input connected to a third node (N3) coupled to the second node (N2) via an adjustment circuit (ADJ) configured to offset the level of the voltage signal of the second node (N2), on the third node (N3), in a controlled manner by a control signal (dgt).

The preamplifier may include a transistor (Mtia) having a control terminal coupled to the first node (N1) and a conduction terminal coupled to the second node (N2), a resistive element coupled between the first node (N1) and the second node (N2), and a current generator circuit (IgenTIA) configured to generate a polarization current on the second node (N2).

The adjustment circuit (ADJ) may include a resistive element (R23) coupled between the second node (N2) and the third node (N3) and a current generator circuit (Igen- DAC) configured to generate an adjustment current on the third node (N3), at an intensity controlled by the control signal (dgt).

The device may further include a control circuit (CMD) configured to generate the control signal (dgt) according to an output signal of the differential amplifier (LNAdiff) so as to offset the level of the voltage signal of the second node (N2) on the third node (N3) to a level centered on the voltage level of the photo-receiving diode (PD) on the first node (N1).

In order to offset the level of the signal on the third node (N3) to a level centered on the voltage level of the photo-receiving diode (PD), the control signal (CMD) may be configured to perform a calibration including a first step (AMBT_clb), intended for first ambient light conditions, including an identification of a first value (X) of the control signal (dgt) allowing to offset the level of the voltage signal on the third node (N3) to the same level as the voltage on the first node (N1) of the photo-receiving diode (PD), and a second step (SGNL_clb), intended for second ambient light conditions, including an identification of a second value (Y) of the control signal (dgt) allowing to offset the level of the voltage signal on the third node (N3) to the same level as the voltage on the first node (N1) of the photo-receiving diode (PD).

The calibration may include the establishment of a calibrated value of the control signal (dgt) equal to the first value added with half the difference between the first value and the second value (X+(Y−X)/2).

The receiver device may further include an output stage (LNA_chn, SQRR) configured to output a square output signal (Sout) from outputs of the differential amplifier (LNAdiff), an oscillator circuit (OSC) configured to generate a plurality of phases of a clock signal having clock cycles, and a signal recovery stage (CDR) configured to detect in the output signal a bit packet start indicator (RE), identify one of said phases (φi) whose clock cycle starts the closest to the bit packet start indicator, and delimit, in the output signal (Sout), bits of a bit packet (A, B, Z) on the clock cycles of the clock signal at the identified phase.

A system for light-signal communication (SYS) may be summarized as including a receiver device, and an emitter device including a photo-emitting diode configured to generate the light signal conveying bit packets, the successive bit packets being separated over time by a duration at least equal to the duration of a bit packet.

The receiver device and the emitter device may collaborate in the calibration so that the emitter device does not generate the light signal in the first step (AMBT_clb), the first ambient light conditions comprising only an ambient luminosity, and so that the emitter device generates the light signal continuously in the second step (SGNL_clb), the second ambient light conditions comprising the ambient luminosity and the luminosity of the emitted signal.

Each of the receiver device and the emitter device may include an independent oscillator circuit (OSC), configured to generate respective clock signals having clock cycles and set at the same frequency, the emitter device being configured to delimit, over the clock cycles of the clock signal, the generation of the bits of the emitted bit packets (A, B, Z), the receiver device being configured to delimit, over the clock cycles of the clock signal, the detection of the bits of the received bit packets (A, B, Z).

A process for receiving a light-signal communication may be summarized as including a generation of a current signal on a first node (N1) from a light signal received by a photo-receiving diode (PD), a pre-amplification (TIA) converting the current signal on the first node (N1) into a voltage signal on a second node (N2), an offset (ADJ), on a third node (N3) of the level of the voltage signal of the second node (N2) in a controlled manner by a control signal (dgt), a differential amplification (LNAdiff) between the voltage present on the first node (N1) and the voltage present on the third node (N3).

The pre-amplification (TIA) may include a flow of the current signal in a resistive element (R12) coupled between a control terminal of a transistor (Mtia) coupled to the first node and a conduction terminal of the transistor (Mtia) coupled to the second node (N2), and a generation of a polarization current on the second node (N2).

The offset (ADJ) on the third node (N3) of the level of the voltage signal of the second node (N2) may include a generation of an adjustment current, with an intensity controlled by the control signal (dgt), in a resistive element (R23) coupled between the second node (N2) and the third node (N3).

The process may include the generation of the control signal (dgt) according to an output signal of the differential amplifier (LNAdiff) so as to offset the level of the voltage signal of the second node (N2) on the third node (N3) to a level centered on the voltage level of the photo-receiving diode (PD) on the first node (N1).

In order to offset the level of the signal on the third node (N3) to a level centered on the voltage level of the photo-receiving diode (PD), a calibration may include a first step (AMBT_clb), intended for first ambient light conditions, including an identification of a first value (X) of the control signal (dgt) allowing to offset the level of the voltage signal on the third node (N3) to the same level as the voltage on the first node (N1) of the photo-receiving diode (PD), and a second step (SGNL_clb), intended for second ambient light conditions, including an identification of a second value (Y) of the control signal (dgt) allowing to offset the level of the voltage signal on the third node (N3) to the same level as the voltage on the first node (N1) of the photo-receiving diode (PD).

The calibration may include the establishment of a calibrated value of the control signal (dgt) equal to the first value added with half the difference between the first value and the second value (X+(Y−X)/2).

The process may further include a processing of the signal derived from the differential amplification (LNAdiff) so as to output a square output signal (Sout), a generation (OSC) of a plurality of phases of a clock signal having clock cycles, and a detection in the output signal (Sout) of a bit packet start indicator (RE), an identification of one of said phases (φi) whose clock cycles starts the closest to the bit packet start indicator (RE), and a delimitation, in the output signal (Sout), of the bits of a bit packet (A, B, Z) over the clock cycles of the clock signal at the identified phase.

A method for communication by light signal (SYS) may be summarized as including a reception process, and an emission including a generation, by a photo-emitting diode, of the light signal conveying bit packets, the successive bit packets being separated over time by a duration at least equal to the duration of a bit packet.

The reception process and the emission may collaborate in the calibration so that the emission may a generation of the light signal in the first step (AMBT_clb), the first ambient light conditions comprising only an ambient luminosity, and so that the emission comprises a continuous generation of the light signal (SGNL_clb), the second ambient light conditions comprising the ambient luminosity and the luminosity of the emitted signal.

Each of the reception process and the emission may include a generation of clock signals having respective clock cycles set at the same frequency, the emission comprising a delimitation, over the clock cycles of the clock signal, of the generation of the bits of the emitted bit packets (A, B, Z), the reception process comprising a delimitation, over the clock cycles of the clock signal, of the detection of the bits of the received bit packets (A, B, Z).

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A light-signal communication receiver device, comprising:
    a photo-receiving diode configured to generate a current signal on a first node from a received light signal;
    a preamplifier configured to convert the current signal on the first node into a voltage signal on a second node; and
    a differential amplifier including a first input connected to the first node, a second input connected to a third node, and an adjustment circuit, the third node being coupled to the second node through the adjustment circuit, the adjustment circuit configured to offset a level of the voltage signal on the third node in a controlled manner by a control signal.

2. The light-signal communication receiver device according to claim 1, wherein the preamplifier includes a transistor having a control terminal coupled to the first node and a conduction terminal coupled to the second node, a resistive element coupled between the first node and the second node, and a current generator circuit configured to generate a polarization current on the third node.

3. The light-signal communication receiver device according to claim 1, wherein the adjustment circuit includes:
    a resistive element coupled between the second node and the third node, and
    a current generator circuit configured to generate an adjustment current on the third node, at an intensity controlled by the control signal.

4. The light-signal communication receiver device according to claim 1, further comprising:
    a control circuit configured to generate the control signal according to an output signal of the differential amplifier so as to offset the level of the voltage signal on the third node to a level centered on a voltage level of the photo-receiving diode on the first node.

5. The light-signal communication receiver device according to claim 4, wherein, in order to offset the level of the voltage signal on the third node to the level centered on the voltage level of the photo-receiving diode, the control circuit is configured to perform a calibration including:
    a first step, intended for first ambient light conditions, including an identification of a first value of the control signal allowing to offset the level of the voltage signal on the third node to the same level as the voltage level of the photo-receiving diode on the first node; and
    a second step, intended for second ambient light conditions, including an identification of a second value of the control signal allowing to offset the level of the voltage signal on the third node to the same level as the voltage level of the photo-receiving diode on the first node.

6. The light-signal communication receiver device according to claim 5, wherein the calibration includes an establishment of a calibrated value of the control signal equal to the first value added with half the difference between the first value and the second value.

7. The light-signal communication receiver device according to claim 1, further comprising:
    an output stage configured to output a square output signal from outputs of the differential amplifier;
    an oscillator circuit configured to generate a plurality of phases of a clock signal having clock cycles; and
    a signal recovery stage configured to detect, in the square output signal, a bit packet start indicator, identify one of the plurality of phases whose clock cycle starts the closest to the bit packet start indicator, and delimit, in the square output signal, bits of a bit packet on the clock cycles of the clock signal at the identified phase.

8. A process for receiving a light-signal communication, the process comprising:
    generating, by a photo-receiving diode, a current signal on a first node from a light signal received by the photo-receiving diode;
    converting, by a preamplifier, the current signal on the first node into a voltage signal on a second node;
    offsetting, by a differential amplifier and on a third node, a level of the voltage signal in a controlled manner by a control signal; and
    performing, by the differential amplifier, differential amplification between a voltage on the first node and a voltage on the third node.

9. The process according to claim 8, wherein the converting includes transmitting the current signal in a resistive element coupled between a control terminal of a transistor coupled to the first node and a conduction terminal of the transistor coupled to the second node, and generating a polarization current on the second node.

10. The process according to claim 8, wherein the offsetting, on the third node, of the level of the voltage signal includes generating an adjustment current, with an intensity controlled by the control signal, in a resistive element coupled between the second node and the third node.

11. The process according to claim 8, further comprising:
    generating the control signal according to an output signal of the differential amplifier so as to offset the level of the voltage signal on the third node to a level centered on a voltage level of the photo-receiving diode on the first node.

12. The process according to claim 11, further comprising:
    in order to offset the level of the voltage signal on the third node to the level centered on the voltage level of the photo-receiving diode, performing a calibration including:
    performing a first step, intended for first ambient light conditions, including identifying a first value of the control signal allowing to offset the level of the voltage signal on the third node to the same level as the voltage level of the photo-receiving diode on the first node; and
    performing a second step, intended for second ambient light conditions, including identifying a second value of the control signal allowing to offset the level of the voltage signal on the third node to the same level as the voltage level of the photo-receiving diode on the first node.

13. The process according to claim 12, wherein the performing of the calibration includes establishing a calibrated value of the control signal equal to the first value added with half the difference between the first value and the second value.

14. The process according to claim 8, further comprising:
outputting a square output signal from outputs of the differential amplifier;
generating a plurality of phases of a clock signal having clock cycles;
detecting, in the square output signal, a bit packet start indicator;
identifying one of the plurality of phases whose clock cycles starts the closest to the bit packet start indicator; and
delimiting, in the square output signal, of bits of a bit packet over the clock cycles of the clock signal at the identified phase.

15. A device, comprising:
a photo-receiving diode configured to receive a light signal and generate a signal based on the light signal;
a preamplifier coupled the photo-receiving diode, the preamplifier configured to convert the signal to a voltage signal; and
a differential amplifier coupled to the photo-receiving diode and the preamplifier, the differential amplifier including:
a current generator circuit configured to receive a control signal, and generate an adjustment current based on the control signal; and
an adjustment circuit configured to offset the voltage signal based on the adjustment current.

16. The device according to claim 15, wherein the adjustment circuit offsets the voltage signal based on a first voltage level of the signal generated by the photo-receiving diode.

17. The device according to claim 16, wherein the differential amplifier outputs a measurement of a difference between the first voltage level of the signal generated by the photo-receiving diode and a second voltage level of the voltage signal offset by the adjustment circuit.

18. A method, comprising:
receiving, by a photo-receiving diode, a light signal;
generating, by the photo-receiving diode, a signal based on the light signal;
converting, by a preamplifier coupled the photo-receiving diode, the signal to a voltage signal;
receiving, by a current generator circuit of a differential amplifier coupled to the photo-receiving diode and the preamplifier, a control signal;
generating, by the current generator circuit, an adjustment current based on the control signal; and
offsetting, by an adjustment circuit of the differential amplifier, the voltage signal based on the adjustment current.

19. The method according to claim 18, wherein the adjustment circuit offsets the voltage signal based on a first voltage level of the signal generated by the photo-receiving diode.

20. The method according to claim 19, further comprising:
outputting, by the differential amplifier, a measurement of a difference between the first voltage level of the signal generated by the photo-receiving diode and a second voltage level of the voltage signal offset by the adjustment circuit.

* * * * *